United States Patent [19]

Reeder

[11] Patent Number: 4,740,986
[45] Date of Patent: Apr. 26, 1988

[54] LASER RESONATOR

[75] Inventor: Robin A. Reeder, El Segundo, Calif.

[73] Assignee: Hughes Aircraft Company, Los Angeles, Calif.

[21] Appl. No.: 811,545

[22] Filed: Dec. 20, 1985

[51] Int. Cl.⁴ .................................. H01S 3/08
[52] U.S. Cl. ............................... 372/92; 372/93; 372/100; 350/286
[58] Field of Search .......... 372/93, 94, 92, 98, 372/100, 99, 108, 10, 12; 350/286, 421, 394, 395

[56] References Cited

U.S. PATENT DOCUMENTS

| 3,434,073 | 3/1969 | Forkner | 372/93 X |
| 3,924,201 | 12/1975 | Crow | 372/93 X |
| 4,247,832 | 1/1981 | Sanders et al. | 372/94 |
| 4,292,602 | 9/1981 | Bergqvist | 372/94 X |
| 4,420,836 | 12/1983 | Harper | 372/93 X |
| 4,525,034 | 6/1985 | Simmons | 350/286 X |
| 4,578,793 | 3/1986 | Kane et al. | 372/92 X |

FOREIGN PATENT DOCUMENTS

| 0153386 | 9/1983 | Japan | 372/55 |
| 387318 | 10/1973 | U.S.S.R. | 350/402 |
| 8601647 | 3/1986 | World Int. Prop. O. | 372/16 |

Primary Examiner—Eugene R. LaRoche
Assistant Examiner—Seung Ham
Attorney, Agent, or Firm—Ronald L. Taylor; A. W. Karambelas

[57] ABSTRACT

A reflectance-outcoupled laser resonator 10 with an improved electro-optical Q-switch 13, 18,19, 21 is disclosed which is alignment stable. The laser performance is insensitive to angular movements of the resonator elements. This resonator requires fewer optical components and lower total cost than other resonators which are designed to perform similar functions. The invention includes a laser medium 12, two prisms 13, 21, a polarizer 18, an electro-optic crystal 19, and an alignment wedge 20. A polarization preserving folding prism 13 allows great flexibility in resonator design by passing any arbitrary polarization state without change. A double end-reflector prism 21 serves as both cavity end reflectors of the resonator and also serves as a component of the Q-switch 13, 18, 19, 21.

16 Claims, 6 Drawing Sheets

ENTRANCE BEAM

Fig. 2c

EXIT BEAM

LASER RESONATOR

BACKGROUND OF THE INVENTION

1. Field of the Invention

The present invention relates to lasers and to apparatus for alignment-stable, reflectance-outcoupled electro-optically Q-switched laser resonators.

2. Background Information

The utility of lasers derives from the unique properties of laser light, including high brightness, monochromaticity, low beam divergence, and coherence. These attributes make the radiation from lasers completely different than the radiation from previously known sources, and open up a wide area of application that includes rangefinding, tracking, motion sensing, communications, seismography, holography, and various defense applications.

Many communications and measurement applications of laser technology require series of pulses of laser radiation which have prescribed energy levels, periods of pulse duration, and intervals between pulses. A series of laser pulses may be produced by a laser which operates in conjunction with a Q-switch. A Q-switch is an apparatus which is used to obtain short, intense bursts of oscillation from lasers. These devices are well known in the electro-optics arts and are described in the text *Optoelectronics: An Introduction*, by J. Wilson and J. F. B. Hawkes, published by Prentice-Hall in 1983.

Q-switching techniques may utilize active or passive components to introduce time or intensity dependent losses into the laser resonator. A Q-switch constrains lasing action within a laser medium by preventing the buildup of oscillations within the resonator. The switching which occurs is a change in the Q or quality factor of the resonator. The quality factor is a quotient which is proportional to the energy stored in a resonator divided by the energy dissipated per cycle. A Q-switch functions by altering the optical pathway within a resonator. When a high loss condition is imposed on a laser cavity, energy which enters the laser medium from an excitation source is dissipated before atoms or molecules in the medium can be stimulated to laser oscillation. If a large population inversion is built up within the laser medium and the Q of the resonator is suddenly increased by eliminating the cavity loss conditions, laser action will suddenly begin. Once the quality factor of the resonator is sharply increased, laser oscillations build-up rapidly within the laser cavity and all available energy is emitted in one, large pulse which substantially depopulates the upper lasing level and shuts down the laser oscillation.

Q-switching may be accomplished using an active component such as a rotating mirror or prism. This technique requires one of the resonator reflectors to be rotated at a high angular velocity so that optical losses within the resonator prevent lasing except for the brief interval in each rotation cycle when the reflectors are substantially parallel. Such systems utilize mirrors or prisms that rotate up to 60,000 revolutions per minute and require costly motor and control apparatus which are susceptible to mechanical failure and misalignment.

Electro-optic, magneto-optic, and acousto-optic modulators may also be used as Q-switches. An electro-optic crystal, for example, may be placed within a laser resonator and alter the quality factor of the cavity by changing the polarization of the radiation in the cavity in response to an electrical signal applied to the crystal. Acoustical devices are employed to deflect some of the laser beam out of the cavity by diffracting light off sound waves and thereby diminish the quality factor of the resonator.

Saturable absorbers can be employed as passive Q-switches. A transparent cell containing a normally opaque, bleachable dye in a suitable solvent is placed within a laser cavity in order to absorb some portion of incident excitation energy. When the dye saturates and can no longer absorb excitation radiation, the dye loses its original opacity and functions as a Q-switch by increasing the optical efficiency of the laser.

The optical feedback loop of a laser resonator fundamentally comprises an active gain medium bounded by reflectors at each end of the resonator cavity. These reflectors must be maintained in precise alignment so that laser radiation emanating from the gain medium can make a myriad of transits through the medium between the reflectors. Resonators are susceptible to high energy losses if the reflectors are even slightly misaligned. Losses large enough to completely disable a resonator can be generated if one of the resonator reflectors is tilted off its alignment axis by only a few milliradians. The use of a Q-switch within a resonator cavity exacerbates typical systemic misalignment losses.

Another source of energy losses which plagues the operation of a laser resonator is dimensional instability within the resonator cavity. Dimensional instability results from the unwanted relative movement of components of the laser resonator. Any change in the optical alignment of the resonator components produces a loss which adversely affects the laser output power and beam quality.

One of the major concerns in designing and fabricating a laser resonator is to substantially eliminate dimensional instability by increasing the alignment insensitivity of the resonator.

For laser systems that are manufactured in large quantities, resonating cavity designs that employ a minimum number of inexpensive part are highly desirable. Moreover, the design should ideally result in a laser cavity and means of radiation outcoupling which result in a performance which is not degraded by temperature change, physical shock, and other environmental hazards; particularly if the laser system is used in the field.

The reflectors placed at either end of the cavity need not be plane mirrors, but must be aligned so that multiple reflections occur with little loss. The resonator cavity is usually very sensitive to changes in alignment of the mirrors. A small tilt of one mirror, for example, subjects the resonator cavity to a large loss of energy. Typically, a relatively small misalignment in the resonator cavity can prevent the operation of the laser transmitter. In addition, the loss of energy through misalignment is made more likely by the use of Q-switching. Q-switches retard stimulated emission by preventing the buildup of oscillations in the resonant cavity. When a high level of population inversion is reached in the laser medium, a Q-switch is triggered to suddenly restore the resonant cavity.

Previous efforts to achieve alignment insensitivity have included the use of concave mirrors, opposite corner-cube reflectors tilted against correlative Brewster angles, and internal reflection prisms arranged with either parallel or obliquely crossed rooflines. In U.S. Pat. No. 4,420,836, Harper discloses an optical resonator cavity configuration using a unitary mirror with oppositely directed convex and concave reflective surfaces that reverse both ends of a laser beam propagating from a laser rod disposed between two total internal reflection prisms rigidly positioned with perpendicularly crossed virtual rooflines. The rooflines of the internal reflection prisms are perpendicular to the axis of the laser beam and to the optical axes of the optical resonator components. The unitary mirror with oppositely directed reflective surfaces of opposite sign positioned between opposite ends of the beam enhances the insensitivity of the resonator cavity to misalignment.

In U.S. Pat. No. 3,896,397, de Wit et al. describe an improved acousto-optically Q-switched laser. Corner-cube and Porro prism retro-reflectors are combined and provide improved tolerances for three of the four mounting adjustments. Since the reflecting element near the laser is a corner cube, and since the feedback reflector is a Porro prism, only a single close tolerance adjustment of the reflectors is necessary.

U.S. Pat. No. 3,959,740—Dewhirst discloses a configuration of crystalline quartz wedges utilized as polarizers in combination with an electro-optic switch which constitutes a laser Q-switch. The two wedges are identical and are positioned on either side of the switch. These wedges are oriented such that each compensates for the angular deviation and dispersion of the other. The principal advantage of the disclosed wedge polarizer configuration is that Dewhirst's configuration does not require calcite for the polarizing material, since a large angular separation of the polarizations is not required. The electro-optic switch is oriented with a Porro prism such that in the off condition, both polarizations are misaligned angularly with the Porro prism. The quartz wedges are considerably less expensive and are more easily mounted and aligned in the laser. Quartz is also more durable than calcite and is not as easily damaged by the laser beam.

In U.S. Pat. No. 3,982,203, de Wit discloses an improved, optically pumped, acousto-optically Q-switched laser which produces significantly increased output energy. Optical coatings, with their inherent limitations on the maximum energy of the output pulse, are eliminated. At the reflecting surfaces, Porro prisms replace conventional mirrors. At the nonreflecting or transmitting surfaces, conventional antireflecting coatings are eliminated by placing the respective elements at the Brewster angle for the dominant polarization of the Q-switching material.

In U.S. Pat. No. RE 29,421, Scott discloses a laser system having an electronically selectable gain which employs an acousto-optical beam deflector to variably control the Q of a laser cavity in response to an electronic signal.

None of the preceding inventions completely solves the concomitant problems of polarization conservation, alignment stability, insensitivity to mechanical and thermal changes, and the difficulties of mass producing reflectance outcoupled laser resonators which include a minimum number of reliable components. Such a solution would satisfy a long felt need manifested by the current efforts of the laser and optoelectronics industries, which continue to attempt to develop laser resonators which can cope with the constantly increasing demands for improved performance as described above.

SUMMARY OF THE INVENTION

The present invention is a low-cost, rugged laser resonator with improved Q-switch using fewer components than previous conventional resonators. It employs two prisms of novel design, one of which serves as both cavity end reflectors and which is used as part of the Q-switch. The second of this pair serves as a folding prism that preserves the polarization state of incident radiation.

The present invention uses fewer, less expensive components than previous designs, provides a laser resonator for which there is less distortion and loss, and is stable against misalignment from motion of the end-reflector elements. The present invention is less susceptible to environmental hazards such as temperature extremes or physical shock, and can be fabricated with mechanical tolerances on its optical mounting surfaces that are not as critical as in conventional designs. The improved Q-switch contained in the present invention does not permit prelasing (lasing before the Q-switch is opened) to take place, even for extremely high input energies. The present invention provides higher efficiency than for conventional designs, and it avoids the temperature alignment problem association with the use of calcite wedge Q-switches.

The present invention comprises a laser resonator which is stable against misalignment because the laser performance is insensitive to motions of the resonator elements. Fewer elements are used than in conventional designs, including two specially designed prisms. A double end-reflector prism serves the function of both end reflectors of the resonator cavity, and in addition, can serve as a component of the resonator Q-switch. A polarization conserving folding prism preserves the polarization state of the incident radiation in addition to folding the beam. The Q-switch design makes use of a mulitlayer thin-film polarizer and a quarter-wave electro-optic crystal.

The laser resonator comprises substantially six optical elements: the four elements mentioned above plus a laser rod and an alignment wedge. The 100% reflector for the resonator is a roof on the double end-reflector prism that makes use of total internal reflection to reflect the incident radiation. The reflective out coupling surface is a dielectric-coated face of the double end-reflector prism. The polarization conserving folding prism folds the resonator beam path without affecting the polarization state of the radiation. The laser rod and alignment wedge are standard components which are readily available commercial items and which are well known to persons ordinarily skilled in the laser and optoelectronics arts.

The electro-optical Q-switch includes the quarter-wave electro-optic crystal, the multilayer thin-film polarizer, and the double end-reflector prism. Radiation passing through the polarizer is linearly polarized at a 45° angle with respect to the longitudinal axis of the double end-reflector prism. With no voltage applied to the electro-optic crystal, the polarization state of the radiation is unaffected as it passes through the crystal. The radiation returning from the double end-reflector prism is not passed by the polarizer because its polarization is shifted 90° from its initial state. When a quarter-wave voltage is applied to the electro-optic crystal, a double pass through the crystal will change the polarization state in such a way that the returning radiation has its polarization aligned with the axis of the polarizer. Thus, the radiation will pass through the polarizer on the return path only when the quarter-wave voltage is applied. The polarization conserving folding prism is necessary to preserve the polarization state of the radiation returning from the dielectric reflective surface of the double end-reflector prism. The radiation is then aligned with the axis of the polarizer.

It is, therefore, an object of the present invention to provide a laser resonator with fewer parts than many conventional resonators.

It is also an object of the present invention to provide a laser resonator with less expensive optical components than many conventional designs.

An additional object of this important invention is to provide a laser resonator which suffers from less distortion and energy losses because there are fewer optical components in the resonating cavity than in conventional designs.

Another object of the invention is to provide a folded laser resonator which is stable against misalignment caused by motion of the end reflector element or of the folding element.

Yet another object of this invention to provide a laser resonator which is less susceptible to environmental hazards such as temperature extremes or mechanical shock than prior designs.

A further object of the present invention to provide a laser resonator for which mechanical tolerances on optical mounting surfaces are not as critical as in conventional designs.

Another object of this innovative design is to provide a laser resonator which is more easily manufactured than conventional resonators and which is easily maintained in the field.

An additional object of the apparatus described in this patent application is to provide an electro-optical Q-switch that results in a higher efficiency for the laser resonator than in conventional designs.

Another object of the present invention is to provide an electro-optical Q-switch that substantially eliminates the phenomenon of prelasing, even at extremely high input energies.

A further object of the invention is to provide an electro-optical Q-switch that avoids the changes in alignment with temperature and prelasing problems which plague calcite and quartz wedge Q-switches.

Yet another object of this invention is to provide a single optical element which serves as both end reflectors of a laser resonator, and which also serves as part of an electro-optical Q-switch in the same resonator.

Still another object of the present invention is to provide an improved optical feedback configuration that is compatible with a wide variety of laser resonator devices.

This resonator also provides a folding prism of novel design which conserves the polarization state of the radiation incident on it, regardless of the initial polarization state of the incident radiation.

A greater appreciation of other aims and objects, along with a more complete and comprehensive understanding of the present invention, may be achieved through the study of the following detailed description and through reference to the accompanying drawings.

DESCRIPTION OF THE PREFERRED EMBODIMENT

Figure 1:
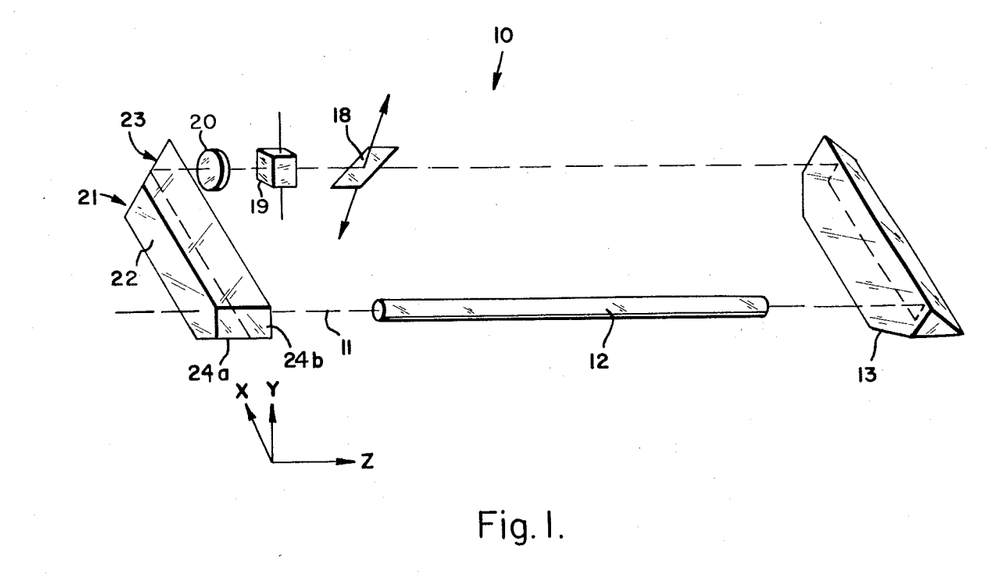
FIG. 1 is a perspective drawing of the laser resonator with improved Q-switch, which includes a polarization conserving folding prism and a double end-reflector prism.

FIG. 1 depicts a laser resonator 10 which includes a solid state laser rod 12 having a longitudinal axis parallel to beam path 11, a polarization preserving folding prism 13, a thin film polarizer 18, an electro-optic crystal 19, an alignment wedge 20, and a double end-reflector prism 21. The laser rod is typically made of neodymium-doped yttrium aluminum garnet (Nd:YAG) or a chromium-aluminum-oxide composition. The rod absorbs excitation energy from an incandescent lamp or flashtube (not shown) in order to create a population inversion of excited electrons or atoms within the gain media. Thin-film polarizer 18 is a conventional optical device which comprises a plurality of dielectric films having alternating indices of refraction. These films polarize incident radiation in the same way a series of glass plates separated by air spaces polarize a beam of light. Radiation which is not passed or absorbed by polarizer 18 is reflected away from beam path 11. A large portion of this reflected radiation is absorbed by beam stops (not shown) which are deployed on either side of polarizer 18. Electro-optic crystal 19 may be a Kerr or Pockels Cell. In the preferred embodiment of the present invention, crystal 19 is fabricated from lithium niobate. Alignment wedge 20 is also a conventional transparent optical element which is essentially a wedged cylindrical or disc-shaped piece of optically-isotropic material. One of the circular end surfaces of the wedge is aligned approximately perpendicular to beam path 11, while the circular end surface which faces the double end-reflector prism 21 is inclined from the direction normal to beam path 11. Wedge 20 may be made of glass. It corrects optical deviation produced by any of the resonator elements.

The radiation beam path 11 is folded by polarization conserving folding prism 13. Four total internal reflections of the beam occur within prism 13, which is shown best in FIG. 2. The resonant cavity is defined by partially reflecting side surface 22a and totally reflecting chisel roof surfaces 24a, 24b of the double end-reflector prism 21. Partially reflecting side surface 22a constitutes the outcoupling means for the laser radiation. A dielectric coating is applied to side surface 22a in order to provide a partially reflecting surface. Beam path 11 is perpendicular to this surface 22a. With the exception of the total internal reflection surfaces, the other surfaces which lie in beam path 11 are coated with an antireflective material.

The resonant cavity is defined by partially reflecting side surface 22a and totally reflecting roof 25 of double end-reflector prism 21. The partially reflecting side surface 22a constitutes the outcoupling means for the laser radiation. The partially reflecting side surface 22a is fabricated by applying a dielectric coating to either side face of the double end-reflector prism that is normal to the beam axis 11. The other surfaces in the beam path are antireflection coated except for the total internal reflection surfaces.

Figures 2A, 2B, 2C:
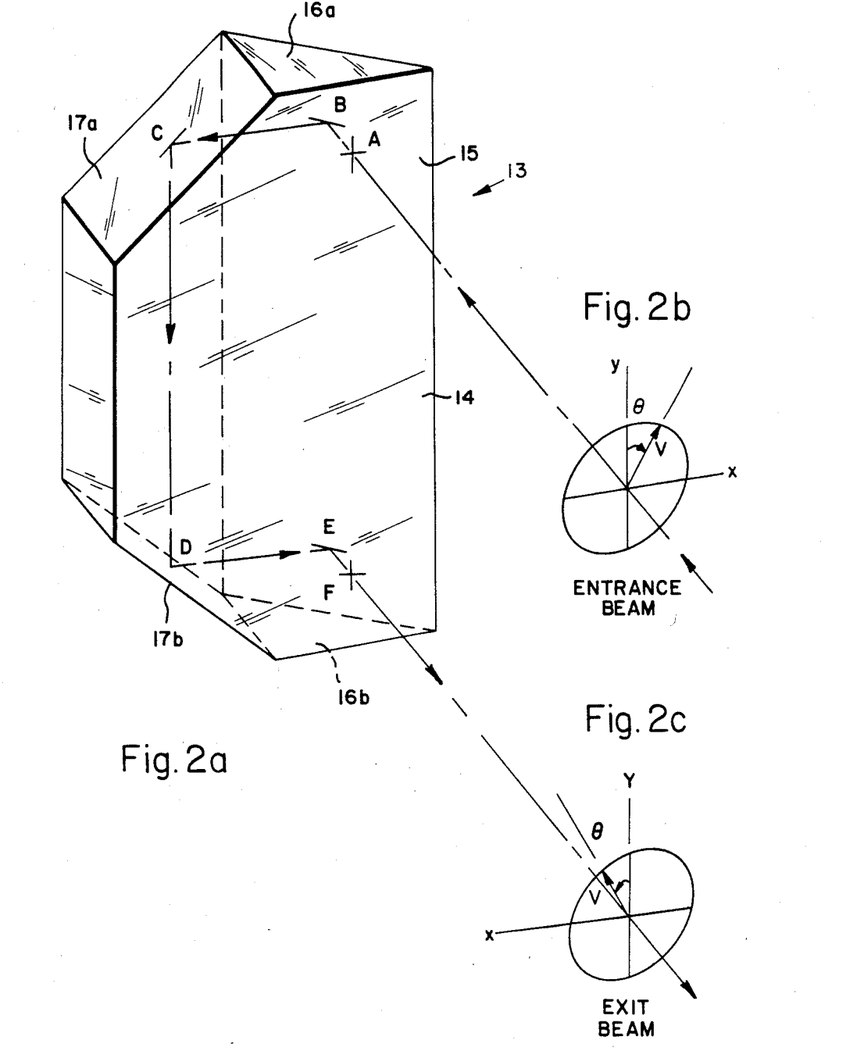
FIG. 2 is a perspective drawing of the polarization preserving folding prism, showing its action on an input beam of linearly polarized light.

The polarization preserving folding prism 13, which is best shown in FIG. 2(a), is a radiation folding waveguide that maintains the relative phase relationships of the components of the polarization vectors of the beam which enters the prism 13. FIG. 2(a) depicts the polarization preserving folding prism 13 in a perspective view and for the special case of linearly polarized radiation. The longitudinal axis of prism 13 is parallel to its longest edge which runs from top to bottom in the drawing. Radiation from laser rod 12 enters prism 13 at point A through a hexagonal, anti-reflecting front surface 14 which is coated with an anti-reflective material in order to permit the laser radiation to enter and exit prism 13 with minimal losses due to surface interactions. This entrance beam, which strikes prism 13 in a direction normal to the plane of hexagonal side 14, is diverted ninety degrees at point B when it strikes the interior of the inclined, rectangular, total internal reflection side 15 of prism 13. Two more total internal reflections at points C and D redirect the beam through another 180 degrees. Points C and D are located on the interior of upper and lower total internal reflection surfaces 17a and 17b of prism 13. The two planes containing this pair of folding surfaces 17a,b are oriented forty-five degrees from the longitudinal axis of prism 13 which is parallel to the long edge of the inclined, rectangular, total internal reflection side 15. Once the beam is reflected off lower total internal reflection surface 17b, it impinges upon the interior of side, 15 at point E and is then reflected through another ninety degrees before it passes out of the polarization conserving folding prism 13 at point F. The exit beam, like the entrance beam, travels in a direction perpendicular to the plane containing hexagonal side 14.

FIG. 2(a) shows the preferred embodiment of prism 13. This version of the present invention may be viewed as an evolution of a conventional folding prism, which is trapezoidal in cross-section, having a base and a top surface parallel to the base which are joined by a pair of side surfaces which are inclined toward the center of the prism. The polarization preserving folding prism 13 differs from a conventional folding prism in that prism 13 has been coupled at its base to a simple right-triangular isoscelas prism. FIG. 2(a) reveals that the end surfaces 16a, b of prism 13 are both adjacent surfaces 14 and 15, and are separately adjacent to surfaces 17a, b. Surfaces 16a, 16b are isosceles triangles having hypotenuse legs that form the transverse edges of rectangular side surface 15. This design provides the desired reflections at points B and E.

FIGS. 2(b) and 2(c) are vectorial depictions of the states of polarization of the entrance and exit beams. Since the incident radiation is plane polarized by thin-film polarizer 18, the vectorial representation illustrated by FIG. 2(b) shows the electric intensity vector V, having some arbitary polarization angle theta. After impinging upon prism 13 and undergoing four total internal reflections, the beam issuing from prism 13 retains the same phase relationship between the vectorial components $V_x$ and $V_y$ of the beam's polarization vector V. The polarization vector V retains the same angle relative to the x and y axes, theta degrees from the y axis. FIGS. 2(b) and 2(c) are not identical because the two beams are travelling in opposite directions. The apparent inclination of the polarization vector V in the two drawings is relative to the direction of travel of the beam. If the plane containing the x and y axes, in FIG. 2(c) is rotated 180 degrees around the y-axis, then both vectors appear parallel, indicating the polarization conserving feature of prism 13.

The polarization conserving folding prism 13 is designed to ensure that equal numbers of P- and S-type reflections of mutually perpendicular components of a polarized light beam occur as the light beam traverses the prism. A P-type reflection is one in which the electric intensity vector of the incident light wave is parallel to the plane of incidence, which is defined as the plane containing both the electric intensity vector and a vector describing the direction of the light wave (such as the Poynting vector). An S-type reflection (from the German "senkrecht") refers to a reflection in which the electric intensity vector is perpendicular to the plane of incidence.

In FIG. 2, a linearly polarized beam with the electric intensity vector oriented at an angle $\theta$ with respect to the y-axis is shown impinging at point A of the surface 14, which is polished flat and has an antireflection coating on it. The electric intensity vector can be resolved into two mutually perpendicular components along the x and y axes of the reference coordinate system shown. The y component undergoes total internal reflections at points B, C, D, and E from surfaces 15, 17(a), 17(b), and 15 (again), respectively, which can be characterized sequentially as S-type, P-type, P-type, and S-type. The reflections of the x component of polarization, on the other hand, can be characterized as P-type at point B (from surface 15), S-type at point C (from surface 17(a)), S-type at point D (from surface 17(a)), and P-type at point E (from surface 15 again). When polarized light is totally internally reflected at the plane boundary between two different dielectric media, the P- and S-type components of polarization, in general, undergo different phase shifts. In order to preserve the initial state of polarization of the incident radiation, the phase difference between the x and y components of polarization must not be allowed to change. This is accomplished in the polarization preserving folding prism 13 because the x and y components of polarization both undergo two P-type and two S-type reflections.

The polarization conserving folding prism 13 was tested in a laser resonator of such a design that the use of a conventional folding prism would have produced large losses due to polarization effects. No polarization induced losses were observed when the polarization conserving folding prism was used. Since the vertical and horizontal components of incident radiation undergo equal numbers of P (parallel to the plane of incidence) and S (perpendicular to the plane of incidence) reflections from the total internal reflection surfaces of the prism, any phase shifts that occur on reflection are exactly the same for both the horizontal and vertical components of the incident radiation, and thus there is no net relative phase shift. This same property of preserving the polarization state of incident radiation is also possessed by the double end-reflector prism.

Figure 3A:
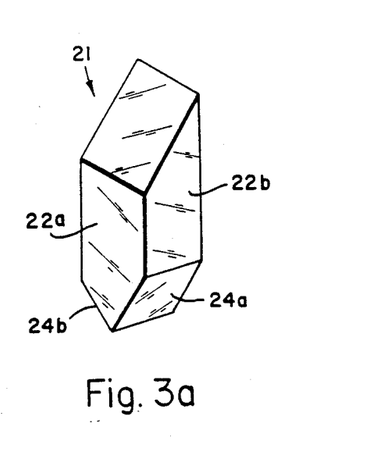
FIG. 3 is a drawing of the double end-reflector prism, showing an isometric view and three orthogonal views.
Figure 3B:
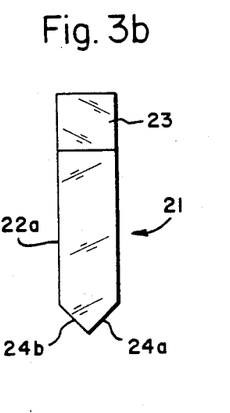
Figure 3C:
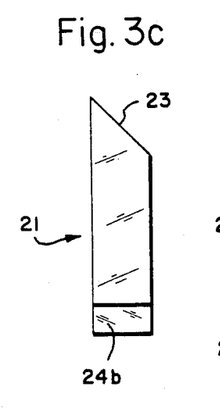
Figure 3D:
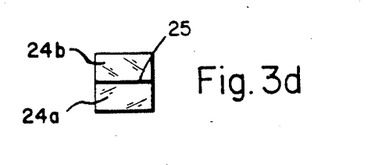

Double end-reflector prism 21 is shown in one isometric and three orthogonal views in FIGS. 3(a), (b), (c), and (d). Prism 21 is essentially a four-sided structure having a slanted roof surface 23 at its top end and terminating in an identical pair of roof surfaces 24a, b divided by a roof crest line 25 at its other end. In the preferred embodiment, the slanted roof surface 23 is inclined forty-five degrees from the prism's transverse axis which runs along its upper end as depicted in FIG. 3(a). The angle between lower surfaces 24a and 24b, which give the bottom portion of prism 21 the appearance of a wedge or chisel, is also forty-five degrees. The front of prism 21, shown as surface 22a in FIG. 3(a), is the outcoupling surface of the resonator 10. The back surface, which is identified in FIG. 3(c) as 22b, is coated with an antireflective material and is polished flat. The slanted roof surface 23 and chisel roof surfaces 24a, b are also polished flat in order to preserve the optical integrity of the beams which are reflected from both sides of these surfaces.

Prism 21 serves as both end reflectors for the laser resonator cavity. The roof surfaces 24a, b prism 21 serve as the 100% reflector by means of total internal reflection, and outcoupling of the laser radiation is effected through a dielectric coating on either one of the prism faces 22a, b perpendicular to the roof edge.

After leaving the laser rod 12, radiation traverses the polarization preserving folding prism 13, passes through thin-film polarizer 18, electro-optic crystal 19, and the alignment wedge 20, and impinges upon double-end reflector prism 21. The radiation undergoes a first total internal reflection off the totally reflecting slanted, upper roof surface 23 of prism 21. After the beam travels along the longitudinal axis of the double end-reflector prism 21, it undergoes two total internal reflections at roof faces 24a, b, travels back along the longitudinal axis, undergoes a second total internal reflection at slanted surface 23, and exits back toward the electro-optic crystal 19.

Figure 4:
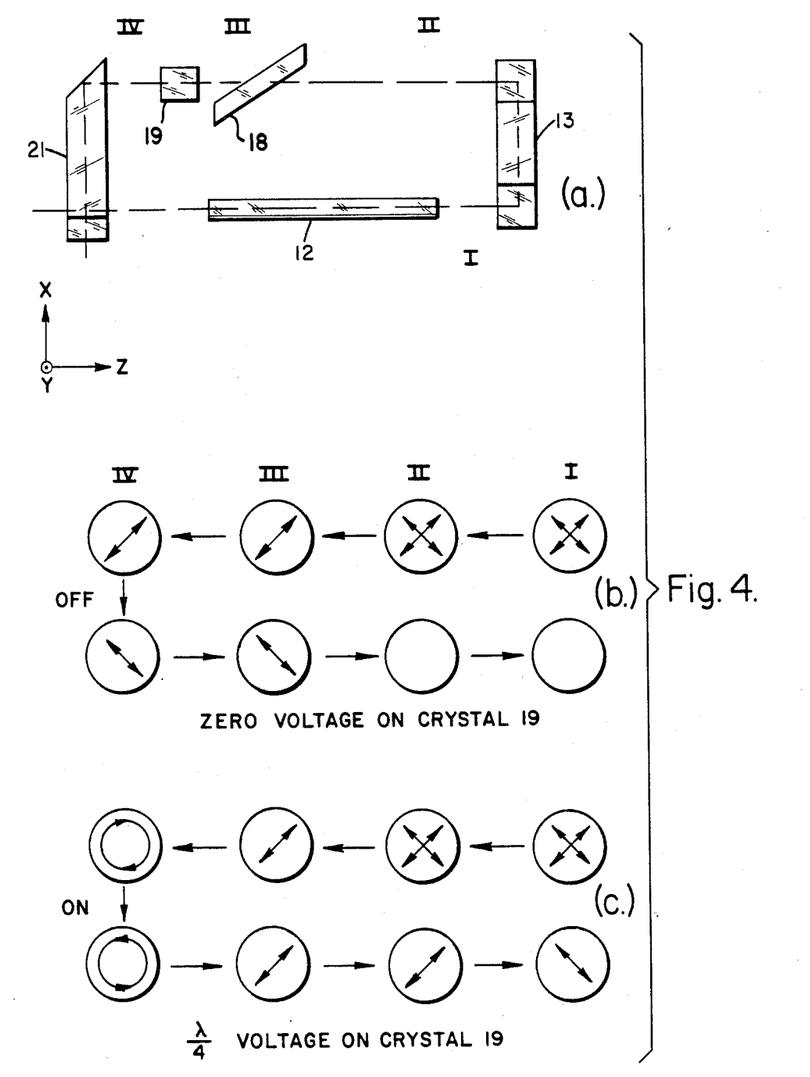
FIG. 4 shows the state of polarization of the radiation at various points of the beam path within the laser resonator, for the two cases of zero voltage applied to the electro-optic crystal and a quarter wavelength voltage applied to the electro-optic crystal.

The double end-reflector prism is also used as an element of the Q-switch in addition to its role as both end reflectors of the resonating cavity. The polarization states of the radiation at various places in the cavity are shown in FIGS. 4(a, b, c). The radiation emitted by laser rod 12 is assumed to be randomly polarized. This polarization state is depicted in Segment I of the beam path diagram shown in FIG. 4(a). The path of the beam within the resonator has been divided into four beam path Segments labelled I, II, III, and IV in FIG. 4(a). FIGS. 4(b) and 4(c) are vectorial representations of the polarization states of the laser beam at Segments I, II, III, and IV for both the outward and return paths of the beam through the entire resonator 10. FIG. 4(c) differs from FIG. 4(b) in that a quarter-wave voltage has now been imposed across the electro-optic crystal 19. When such a voltage is applied to this crystal 19, the crystal acts like a quarter-wave plate which converts the incident linearly polarized light into circularly polarized light.

The orthogonal arrows in the upper right portion of FIG. 4(b) indicate that the laser radiation emerging from rod 12 on its way to double end-reflector prism 21 is unpolarized. This polarization state is unchanged by polarization conserving folding prism 13, so the next representation under "II" is the same. Thin-film polarizer 18 changes the polarization states of the radiation in Segments I and II, so that Segment III is represented by a vector inclined forty-five degrees from the vertical. When the electro-optic crystal 19 is not energized, the polarization angle is unchanged when the radiation passes through it. Therefore, the representations in FIG. 4(b) for Segments II and IV in the outbound pass to the totally reflective mirror surfaces 24a, b are identical.

The polarization states are also preserved as the radiation passes through double end-reflector prism 21. The vector illustrations are rotated through ninety degrees in the bottom row only because the direction of the return beam is now antiparallel to the outbound beam. Since crystal 19 is not operating, the polarization state is not altered as the radiation transits from Segment IV back to Segment III. Now, however, the beam is blocked by thin-film polarizer 18 since the polarization state of the beam does not match that which is passed by the polarizer. Accordingly, no beam passes back to Segments II and I in FIG. 4(b).

FIG. 4(c) reveals what happens to the beam when crystal 19 is activated. When the radiation passes through the cell 19, the incident linearly polarized light is changed to right-circularly polarized radiation. When the beam travels back from the double end-reflector prism 21 in the opposite direction, it appears as left-circularly polarized radiation. As the beam passes through the cell 19 on its way back to laser rod 12, the cell changes the beam back to its former, linearly polarized condition. This polarization state is the state which thin-film polarizer 18 will pass, which enables the lasing process to occur.

Figure 5:
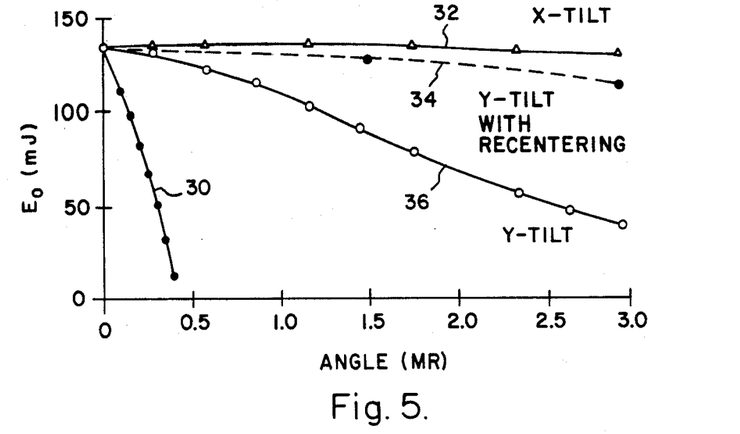
FIG. 5 is a graph of the sensitivity of laser output energy to x- or y-tilt of the double end-reflector prism, compared to the alignment sensitivity of a conventional resonator.

A Q-switched laser breadboard was extensively tested in which the double end-reflector prism was used as an element of the Q-switch and as the cavity end reflectors. The performance of the laser did not deteriorate when the double end-reflector prism was tilted by 100 microradians. The performance of a similar conventional laser resonator would greatly deteriorate if either end reflector were tilted by this same amount. For a conventional resonator, the output, E, decreased 20% and the beam divergence increased 35%, as can be seen from FIGS. 5 and 6. In FIG. 5, the output energy, E, measured in millijoules for a conventional resonator is shown by curve 30. Even for a tiny amount of misalignment, the conventional resonator fails to operate. Only 0.3 milliradians of deflection causes the conventional resonator to lose one-half of its output power. Curve 32 depicts experimental data for the present invention. Curve 32 reveals that the present invention is almost totally insensitive to misalignment from the x axis in either the end-reflector prism 21 or the folding prism 13. Curves 34 and 36 illustrate that the present invention is also substantially insensitive to misalignment from the y axis.

Figure 6:
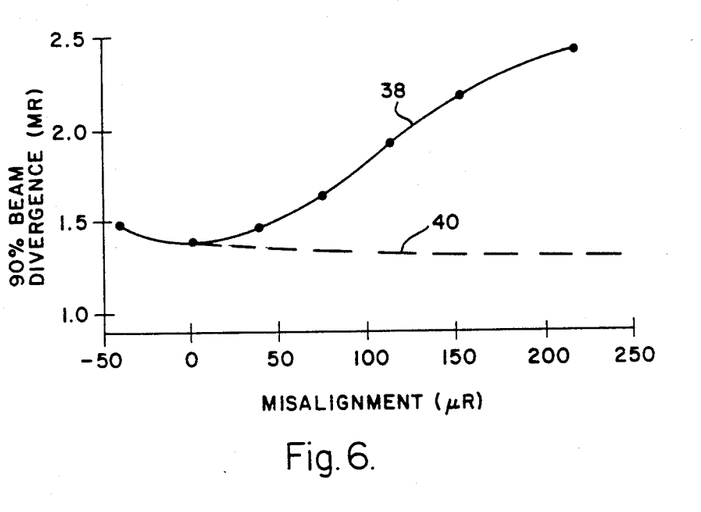
FIG. 6 is a comparison of laser beam divergence caused by misalignment of the wedge in a conventional resonator to the change in beam divergence as a function of y-tilt in the double end-reflector prism in the present invention.

FIG. 6 reveals that for misalignment of the resonator from the y axis by an angle of about 200 microradians, a conventional resonator suffers an increase in beam divergence (curve 38) which is nearly twice as bad as the beam divergence experienced by the present invention as illustrated by curve 40.

Figure 7:
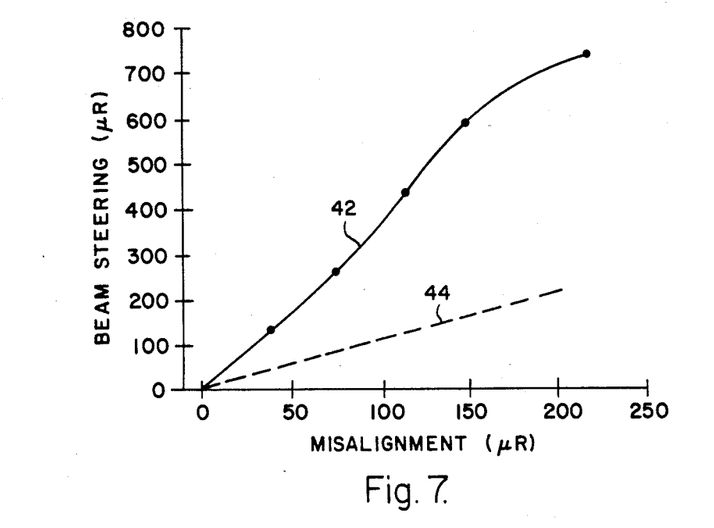
FIG. 7 is a comparison of the sensitivity of beam steering to wedge misalignment in the conventional resonator and the sensitivity of beam steering to tilt of the double end-reflector prism in the present invention.
Figure 8:
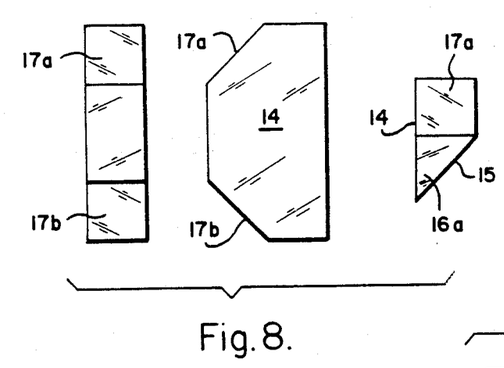
FIG. 8 shows, from left to right, a top view, a front view and a side view of the polarization preserving folding prism of FIG. 2.
Figure 9:
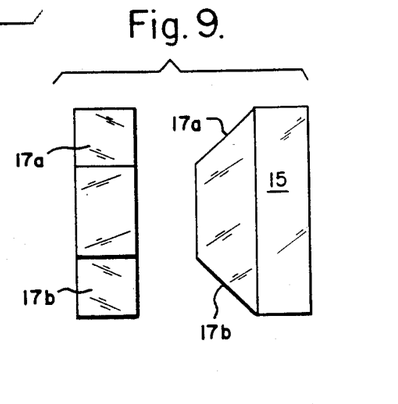
FIG. 9 shows, from left to right, a top view and a rear view of the polarization preserving prism of FIG. 2.
Figure 10:
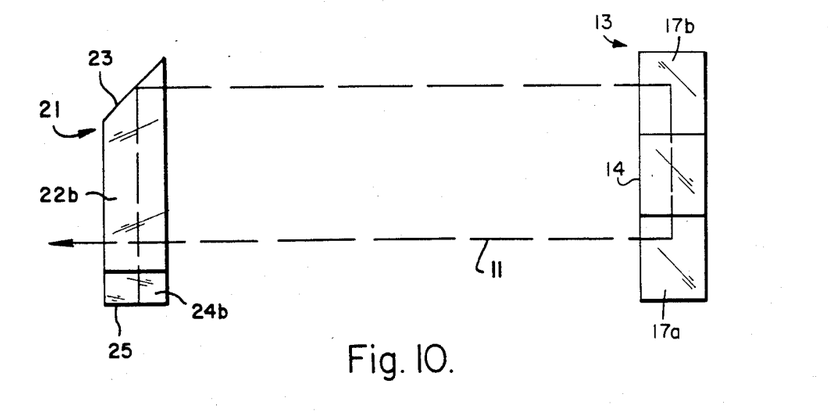
FIG. 10 shows the radiation beam path through the folding prism 13 and the double end-reflector prism 21.

FIG. 7 shows that conventional resonators are plagued by enormous beam steering error caused by reflector misalignment. Even when the double end-reflector prism 21 is out of alignment by as much as 200 microradians, beam steering error remains relatively low (curve 44) compared to the large error of 700 microradians for the conventional resonator (curve 42). As FIG. 7 shows, the beam steering changes by an amount four times the tilt of either end reflector (for the particular resonator length tested), whereas the change in line of sight for the resonator using the double end-reflector prism is equal to the tilt of double end-reflector prism 21.

Some deterioration of the performance of the laser breadboard was observed for larger tilts of double end-reflector prism 21. A tilt of 500 microradians caused a 5% decrease in output energy, but actually reduced beam divergence by 9%. The magnitude of this tilt applied to either end mirror of a conventional resonator is enough to cause the laser to stop lasing.

Laser resonator configurations using the double end-reflector prism such as the ones depicted in FIGS. 1 and 4 are stable against misalignment due to movements of either the double end-reflector prism or the folding prism (either polarization-preserving or conventional). Motion of the double end-reflector prism about the x and y axes shifts the beam line of sight by an amount equal to the angular motion, but the output beam remains normal to the outcoupling surface of the double end-reflector prism. The beam line of sight is unaffected by angular motion of the folding prism.

The resonator's angular alignment is unaffected by the motion of either the double end-reflector prism 21 or the folding prism 13. Initial alignment is made with an intra-resonator alignment wedge (not shown). When the resonator is properly aligned, the output radiation exits normal to the outcoupling surface 22 of the double end-reflector prism 21. The alignment insensitivity of the resonator is best understood by tracing the path of a ray which is normal to the outcoupling surface 22. After traversing the length of the resonator through folding prism 13 and the double end-reflector prism 21, the ray is retroreflected and arrives in proper alignment normal to the outcoupling surface 22. If the double end-reflector prism 21 is tilted about the x axis, then the ray strikes the roof off center, but the ray is still in the retroreflective plane. Tilting the double end-reflector prism 21 about the y axis only shifts the ray along the crest 26 without decentering its point of impingement. Rotation about the y axis changes the orientation of both the ray and the retroreflective plane by the same amount so that the retroreflection is undisturbed. Tilting the double end-reflection prism 21 about the z axis decenters the ray at the roof crest 25, but does not move it out of the retroreflective plane.

The folding prism 13 is also insensitive to motion about all three axes. Displacement from the x axis only decenters the ray at roof crest 25 but does not misalign the resonator. The same is true for motion about the z axis. Displacement from the y axis only moves the ray along roof crest 25, and thus no decentering or misalignment occurs.

The present invention represents a marked improvement over conventional laser resonator designs which include an output reflector, a folding prism, an electro-optical Q-switch comprising a half-wave lithium niobate crystal, two crystal wedges, an alignment wedge and a 100% reflector or Porro prism. The crystal wedges are usually made of either quartz or calcite. The use of either the calcite or quartz wedges has certain disadvantages which are avoided by the present invention. Two problems which are inherent in the use of the wedges are prelasing (lasing before the Q-switch is opened) and shifts in alignment due to temperature changes. The optical properties of calcite and quartz are such that thicker wedges of quartz must be used to produce the same resistance to prelasing as that of calcite. However, the effect of temperature change is less for quartz than for calcite. The tendency for prelasing to occur is inversely related to the angular displacement between the ordinary and extraordinary rays, so that calcite is superior to quartz in this respect. On the other hand, Q-switches using calcite wedges are more susceptible to misalignment due to changes in temperature. In addition, such conventional Q-switches are very costly. The Q-switch of the present invention is lower in cost and is more efficient than corresponding conventional Q-switches.

Because it uses fewer components, the resonator of the present invention has lower distortion and losses than for a conventional resonator. It will not prelase even at extremely high input energies and is stable against misalignment. It is much less sensitive to slight movements of the resonator end reflectors than conventional resonators, in the sense that the performance of the laser will not deteriorate.

Because of all these advantages over previous designs, the present invention should find wide application in the manufacture of lasers and laser systems. It is not as susceptible to environmental hazards such as temperature extremes and physical shocks, and the mechanical tolerances on optical mounting surfaces are much less critical than for conventional designs. Because of these favorable qualities, the use of the present design should result in more easily manufactured lasers and laser systems which will require less maintenance, even after operation under rugged conditions in the field.

The term "laser radiation", which appears many times in this specification, should be understood to connote a broad range of radiant energy which is not limited to energy within the narrow confines of the visible spectrum. The advantages gained by using the present invention in a laser resonator with a solid state rod may also be exploited in lasers having gaseous or liquid phase gain media.

Although the present invention has been described in detail with reference to a particular preferred embodiment, persons possessing ordinary skill in the art to which this invention pertains will appreciate that various modifications and enhancements may be made without departing from the spirit and scope of the invention.

What is claimed is:

1. A radiation folding waveguide comprising:
   reflector means for transmitting incident radiation;
   said reflector means including a first surface which:
      has a longitudinal axis along its longest dimension and a bottom edge colinear with said longitudinal axis,
      is substantially anti-reflective,
      is disposed substantially perpendicular to said incident radiation,
      and which receives and passes said incident radiation;
   said reflector means further including a second surface adapted to reflect radiation by total internal reflection, said second surface having a front edge which joins said bottom edge and is coextensive therewith, said second surface being disposed at an angle of inclination to said front surface; and said reflector means further including a plurality of folding surfaces for conducting said incident radiation by total internal reflection.

2. A polarization conserving, radiation folding element comprising:

reflector means for receiving and redirecting incident radiation away for said reflector means in a direction substantially anti-parallel to a direction of incidence;

said reflector means including a first surface which:
has a longitudinal axis along its longest dimension,
is substantially anti-reflective,
is disposed substantially perpendicular to said incident radiation,
and which receives and passes said incident radiation;

said reflector means further including a second surface adapted to reflect radiation by total internal reflection;

said reflector means further including a pair of surfaces perpendicular to said first surface and disposed at equal angles of inclination relative to said longitudinal axis in order to redirect said incident radiation by total internal reflection;

said reflector means also having a plurality of total internal reflection points including equal numbers of P-type and S-type reflections so that said reflector means preserves an incident polarization state of said incident radiation; and said reflector means having said internal reflection points located so that said reflector means is substantially alignment stable for rotations about its axes.

3. A beam folding, polarization preserving, alignment stable, intermediate reflector prism for use in a laser resonator that emits a plurality of beams comprising:

a first hexagonal exterior surface which:
has a longitudinal axis parallel to a pair of longitudinal edges,
includes a pair of transverse edges orthogonal to said longitudinal edges,
is coated with an anti-reflective material,
is aligned substantially perpendicular to said beams,
and which receives and passes said beams;

a second rectangular surface which:
shares a common longitudinal edge with said first hexagonal exterior surface, has an identical pair of transverse edges perpendicular to said longitudinal edge that each form forty-five degree angles with said first hexagonal exterior surface,
and which is adapted to reflect said beams at two reflection points by total internal reflection;

an identical pair of rectangular surfaces which:
each have a pair of transverse edges aligned perpendicular to said longitudinal axis,
are arranged such that their interior surfaces face toward said second rectangular surface,
are each contiguous and perpendicular to said first hexagonal exterior surface, and
are each inclined forty-five degrees from said longitudinal axis in order to redirect said beams at central reflection points by total internal reflection;

an identical pair of right, isoceles, triangular end surfaces which:
each separately share one of said transverse edges of said second rectangular surface,
each separately share one of said transverse edges of said first hexagonal surface,
and which each separately share one of said transverse edges of said identical pair of rectangular surfaces;

said reflector prism also having four total internal reflection points including two P-type and two S-type reflections so that said reflector prism preserves an incident polarization state of each of said beams; and said reflector prism having said four internal reflection points located so that said reflector prism is substantially alignment stable for rotations about its three axes.

4. A reflectance-outcoupled radiation waveguide comprising:

a substantially anti-reflective surface aligned perpendicular to an incident beam of radiation adapted to receive and pass said incident radiation;

a first substantially total reflector means, a second substantially total reflector means, and a partial reflector means;

said first substantially total reflector means:
being disposed to receive said incident beam from said substantially anti-reflective surface and
being disposed to transmit said incident beam by total internal reflection to said second substantially total reflector means;

said second substantially total reflector means further including a plurality of roof reflector surfaces for returning said incident beam back to said first substantially total reflector means and then out of said reflectance-outcoupled radiation waveguide through said substantially anti-reflective surface; and said partial reflector means including an outcoupling surface aligned substantially perpendicular to an incident beam.

5. A reflectance-outcoupled, polarization preserving, alignment stable, double end-reflector prism for a laser resonator comprising:

a pentagonal, substantially anti-reflective surface having:
a first, transverse edge end;
a second, chisel edge end;
two longitudinal edges running in the direction of said prism's longest dimension;
said pentagonal surface being aligned perpendicular to an incident beam of laser radiation adapted to receive and pass said incident laser radiation;

a slanted, substantially totally reflective roof surface having:
an upper transverse edge orthogonal to said longitudinal edges of said pentagonal surface and
said slanted roof surface forming an angle of forty-five degrees with said longitudinal edges of said pentagonal surface;
said slanted roof surface and said pentagonal surface further having a common transverse edge at said first, transverse edge end of said pentagonal surface;

an identical pair of substantially totally reflective, rectangular, chisel roof surfaces coupled to said pentagonal surface at said second, chisel edge end of said pentagonal surface;

a reflectance-outcoupling surface aligned normal to an output beam from said laser;

said double end-reflector prism further having a plurality of total internal reflection points including equal numbers of P-type and S-type reflections so that said double end-reflector prism preserves an incident polarization state of said incident laser radiation; and said double end-reflector prism also having said internal reflection points located so that said double end-reflector prism is substantially alignment stable for rotations about its three axes.

6. A Q-switched laser comprising:

a laser gain medium for emitting a beam of coherent radiation;

a radiation folding waveguide disposed to receive, reflect and emit the beam of coherent radiation, said waveguide comrising:

reflector menas including a first surface which:

has a longitudinal axis along its longest dimension and a bottom edge colinear with said longitudinal axis, is substantially anti-reflective, is disposed substantially perpendicular to said coherent radiation emitted by said gain medium, and which receives and passes said radiation;

said reflector means further including a second surface adapted to reflect radiation by total internal reflection, said second surface having a front edge which joins said bottom edge and is coextensive therewith, said second surface being disposed at an angle of inclination to said front surface; and said reflector means further including a plurality of folding surfaces for conducting said radiation by total internal reflection;

said laser further comprising:

a reflectance-outcoupled radiation waveguide comprising:

a substantially anti-reflective surface aligned perpendicular to the radiation emitted by said folding waveguide, said anti-reflective surface being adapted to receive and pass said incident radiation;

a first substantially total reflector means, a second substantially total reflector means, and a partial reflector means;

said first substantially total reflector means:

being disposed to receive said radiation from said substantially anti-reflective surface and being disposed to transmit said radiation by total internal reflection to said second substantially total reflector means;

said second substantially total reflector means further including a plurality of roof reflector surfaces for returning said radiation back to said first substantially total reflector means and then out of said reflectance-outcoupled radiation waveguide through said substantially anti-reflective surface;

said partial reflector means including an outcoupling surface aligned substantially perpendicular to said radiation;

said laser further comprising:

a polarizer disposed within said radiation beam and between said radiation folding waveguide and said reflectance-outcoupled radiation waveguide; and an electro-optic crystal disposed within said radiation beam and between said polarizer and said reflectance-outcoupled radiation waveguide, said crystal being energized by an applied signal to polarize said beam such that said beam is passed by said polarizer when said crystal is energized, said polarizer blocking said beam when said crystal is not energized.

7. An alignment stable Q-switched laser system comprising:

a laser gain medium having a first and a second end for emitting a beam of radiation;

a polarization preserving folding prism disposed relative to said first end to receive, fold and emit said beam by four internal total reflections, said folding prism having an equal number of S-type and P-type internal total reflections;

a radiation polarizer disposed to receive the the beam emitted by said folding prism and to linearly polarize and pass the beam therethrough;

an electro-optic crystal disposed to receive said polarized beam and pass the linearly polarized beam therethrough, said crystal comprising excitation means operable for causing said crystal to circularly polarize the beam only when said excitation means is energized; and a double-end reflector prism disposed to receive the beam passing through said crystal, fold and emit the beam by four internal total reflections such that the beam is emitted back toward said crystal, said double-end reflector prism further being disposed relative to said second end of said laser gain medium for outcoupling said beam from the system.

8. A Q-switched laser system as defined in claim 7 wherein said polarizer passes the beam emitted from said double end reflector prism only when said excitation means is energized.

9. A Q-switched laser system as defined in claim 8 wherein said polarization preserving folding prism emits a plurality of beams and comprises:

a first hexagonal exterior surface which:

has a longitudinal axis parallel to a pair of longitudinal edges, includes a pair of transverse edges orthogonal to said longitudinal edges, is coated with an anti-reflective material, is aligned substantially perpendicular to said beams, and which receives and passes said beams;

a second rectangular surface which:

share a common longitudinal edge with said first hexagonal exterior surface, has an identical pair of transverse edges perpendicular to said longitudinal edge that each form forty-five degree angles with said first hexagonal exterior surface, and which is adapted to reflect said beams at two reflection points by total internal reflection;

an identical pair of rectangular surfaces which:

each have a pair of transverse edges aligned perpendicular to said longitudial axis, are arranged such that their interior surfaces face toward said second rectangular surface, are each contiguous and perpendicular to said first hexagonal exterior surface, and are each inclined forty-five degrees from said longitudinal axis in order to redirect said beams at central reflection points by total internal reflection;

an identical pair of right, isosceles, triangular end surfaces which:

each separately share one of said transverse edges of said second second rectangular surface, each separately share one of said transverse edges of said first hexagonal surface, and which each separately share one of said transverse edges of said identical pair of rectangular surfaces;

said reflector prism also having four total internal reflection points including two P-type and two S-type reflections so that said reflector prism preserves an incident polarization state of each of said beams; and said reflector prism having said four internal reflection points located so that said reflector prism is substantially alignment stable for rotations about its three axes.

10. A Q-switched laser system as defined in claim 9 wherein said double end reflector prism comprises:
 a pentagonal, substantially anti-reflective surface having:
  a first, transverse edge end;
  a second chisel edge end;
  two longitudinal edges running in the direction of said prism's longest dimension;
  said pentagonal surface being aligned perpendicular to the beam of laser radiation and being adapted to receive and pass said beam;
 a slanted, substantially totally reflective roof surface having:
  an upper transverse edge orthogonal to said longitudinal edges of said pentagonal surface and
  said slanted roof surface forming an angle of forty-five degrees with said longitudinal edges of said pentagonal surface;
  said slanted roof surface and said pentagonal surface further having a cotton transverse edge at said first, transverse edge end of said pentagonal surface;
  an identical pair of substantially totally reflective, rectangular, chisel roof surfaces coupled to said pentagonal surface at said second, chisel edge end of said pentagonal surface;
  a reflectance-outcoupling surface aligned normal to an output beam emitted by said second end of said gain medium;
  said double end-reflector prism further having a plurality of total internal reflection points including equal numbers of P-type and S-type reflections so that said double end-reflector prism preserves an incident polarization state of said beam; and
  said double end-reflector prism also having said internal reflection points located so that said double end-reflector prism is substantially alignment stable for rotations about its three axes.

11. A Q-switched laser system as defined in claim 11 wherein said electro-optic crystal is a Pockels cell.

12. A Q-switched laser system as defined in claim 11 wherein said polarizer is a linear 45 degree polarizer and wherein said excitation means impresses a quarter wave voltage on said Pockels cell.

13. A Q-switched laser system as defined in claim 11 further comprising an alignment wedge disposed in the beam between said crystal and said double-end reflector prism.

14. A Q-switch for a laser resonator comprising:
 a radiation folding waveguide disposed to receive, reflect and emit a beam of coherent radiation, said waveguide comprising:
 reflector means including a first surface which:
  has a longitudinal axis along its longest dimension and a bottom edge colinear with said longitudinal axis,
  is substantially anti-reflective,
  is disposed substantially perpendicular to said coherent radiation and which receives and passes said radiation;
 said reflector means further including a second surface adapted to reflect said radiation by total internal reflection, said second surface having a front edge which joins said bottom edge and is coextensive therewith, said second surface being disposed at an angle of inclination to said front surface; and
 said reflector means further including a plurality of folding surfaces for conducting said radiation by total internal reflection;
 said Q-switch further comprising:
 a double end reflector folding prism comprising:
 a substantially anti-reflective surface aligned perpendicular to the radiation emitted by said folding waveguide, said anti-reflective surface being adapted to receive and pass said radiation;
 a first substantially total reflector means and a second substantially total reflector means;
 said first substantially total reflector means:
 being disposed to receive said radiation from said substantially anti-reflective surface and being disposed to transmit said radition by total internal reflection to said second substantially total reflector means;
 said second substantially total reflector means further including a plurality of roof reflector surfaces for returning said radiation back to said first substantially total reflector means and out of said double end reflector folding prism through said substantially anti-reflective surface;
 said Q-switch further comprising:
 a polarizer disposed within said radiation beam and between sid radiation folding waveguide and said double end reflector folding prism; and
 an electro-optic crystal disposed within said radiation beam and between said polarizer and said double end reflector folding prism, said crystal being energized by an applied signal to polarize said beam such that said beam is passed by said polarizer when said crystal is energized, said polarizer blocking said beam when said crystal is not energized.

15. A Q-switch as claimed in claim 14 wherein said radiation folding waveguide and said double end reflector folding prism each have equal numbers of P-type and S-type total internal reflection points such that the polarization of said beam is preserved within each of said prisms.

16. A Q-switch as claimed in claim 15 wherein said radiation folding waveguide and said double end reflector prism each have said internal reflection points located so that each of said prisms is substantially alignment stable for rotations about its three axis.

* * * * *